United States Patent [19]

Ishibai et al.

[11] Patent Number: 5,087,115
[45] Date of Patent: Feb. 11, 1992

[54] ASPHERICAL GLASS LENS ELEMENT SUITABLE FOR AN OBJECT LENS ELEMENT OF A DISK DEVICE

[75] Inventors: Isao Ishibai; Hitonobu Otsu; Yutaka Kawai, all of Tokyo, Japan

[73] Assignee: Hoya Corporation, Tokyo, Japan

[21] Appl. No.: 491,223

[22] Filed: Mar. 9, 1990

[30] Foreign Application Priority Data

Mar. 10, 1989 [JP] Japan .................................. 1-56206

[51] Int. Cl.$^5$ ...................... B29D 11/00; G02B 13/18
[52] U.S. Cl. .................................................. 359/719
[58] Field of Search .......................... 350/432, 433–435

[56] References Cited

U.S. PATENT DOCUMENTS

| | | | |
|---|---|---|---|
| 4,571,034 | 2/1986 | Nakamura | 350/432 |
| 4,902,113 | 2/1990 | Ishiwata | 350/432 |
| 4,902,114 | 2/1990 | Arai | 350/432 |
| 4,932,763 | 6/1990 | Matsuoka | 350/432 |
| 4,953,959 | 9/1990 | Ishiwata et al. | 350/432 |

FOREIGN PATENT DOCUMENTS 61-2117   1/1986   Japan ................................. 350/432

Primary Examiner—Bruce Y. Arnold
Assistant Examiner—James Phan
Attorney, Agent, or Firm—Ladas & Parry

[57] ABSTRACT

In an aspherical glass lens element which has an optical axis, a focal length f, a thickness along the optical axis, and first and second aspherical convex surfaces defined by first and second predetermined formulae represented as functions of first and second radii of curvature $r_1$ and $r_2$ at apexes of the first and the second aspherical convex surfaces and first and second conical coefficients $k_1$ and $k_2$, a first factor of f/D, a second factor of $(r_1/r_2)D$, and a third factor of $k_1/k_2$ fall within the following ranges:

$$1.68 < f/D < 1.75,$$

$$-0.18 < (r_1/r_2)D < -0.10, \text{ and}$$

$$-0.08 < k_1/k_2 < 0.04,$$

where an absolute value of the second coefficient $k_2$ is smaller than 1000.

8 Claims, 13 Drawing Sheets

SPHERICAL ABERRATION

FIG. 2 (B)

ASTIGMATISM

COMA

COMA

FIG. 4 (A)

SPHERICAL ABERRATION

FIG. 4 (B)

ASTIGMATISM

COMA

FIG. 5(A)

SPHERICAL ABERRATION

FIG. 5(B)

ASTIGMATISM

COMA

FIG. 6(A)

SPHERICAL ABERRATION

FIG. 6(B)

ASTIGMATISM

COMA

FIG. 7(A)

SPHERICAL ABERRATION

FIG. 7(B)

ASTIGMATISM

COMA

ASPHERICAL GLASS LENS ELEMENT SUITABLE FOR AN OBJECT LENS ELEMENT OF A DISK DEVICE

BACKGROUND OF THE INVENTION

This invention relates to a minute optical lens element which is operable as an object lens system of a disk device, such as a video disk device, a laser disk device, a disk device for a computer memory, and an optical disk device which may be a magnetic optical disk device.

In general, an object lens system of the type described should have high performance and large aperture when it cooperates with the disk device because information must be accurately read from such a disk device in which information is memorized with a high density. In this connection, aberrations must be accurately corrected or adjusted in the object lens system to the extent that a point image is determined by a diffraction limit of light. Specifically, when definition is made about the aberrations defined within a half field angle between ±1 and ±2 not only with respect to an axial ray but also with respect to an offaxial ray, the aberrations must be corrected so that they fall within a range smaller than a quarter wavelength of the diffraction limit of light.

In order to realize such a high performance lens system, conventional proposals have been mainly directed to a lens system which comprises a plurality of spherical glass lens elements and which may be called a combination lens system. However, each glass lens element and a body tube must be precisely machined or processed in such a lens system when manufacturing each lens element and the body tube. In addition, the spherical glass lens elements must be also precisely aligned with one another on assembling the combination lens system so as to prevent the spherical glass lens elements from being off center from one another. Accordingly, a number of processing stages should be accurately performed to assemble the spherical glass lens elements. This makes it difficult to reduce the cost of manufacturing the combination lens system.

Moreover, it is preferable that, when the combination lens system is used as an object lens system, the object lens system is light in weight and small in size. This is because the object lens system should respond to a high speed access operation which is carried out during tracking or focusing. However, the body tube inevitably becomes long in structure and the combination lens system becomes heavy in weight. Thus, it is difficult to make the combination lens system light in weight and small in size.

Recent attempts have been directed to an object lens element which is formed as a single minute optical lens element in a pickup optical system of an optical disk device. Such a single optical lens element should have high performance and the large aperture, like the combination lens system when it is used as the object lens system. Specifically, the single optical lens element should have resolving power which is equal to or less than 1 micron meter.

As such a single optical lens element, a compact and light-weight lens system has been disclosed by T. Nakamura in U.S. Pat. No. 4,571,034, assigned to Olympus Optical Co., Ltd. The compact and light-weight lens system is formed by a single aspherical lens element which has a focal length f, a refractive index n, and entrance and exit aspherical surfaces determined by predetermined formulae, respectively. Each of the predetermined formulae is dependent on a conical coefficient k of each surface, and a radius of curvature r of each surface. More specifically, the conical coefficients $k_1$ and $k_2$ of the entrance and the exit surfaces are defined by:

$$-2.2 < k_1 < 1.1 \text{ and} \quad (1)$$

$$0.8 < k_2 < 1.2, \text{ respectively.} \quad (2)$$

In addition, a factor of $(n-1)f/r_1$ falls within a range between 0.6 and 1.4, both exclusive, where $r_1$ is the radius of curvature of the entrance surface.

Herein, it is mentioned here that a center or an optical axis of the entrance surface is often offset from that of the exit surface when manufacturing such a single aspherical lens element. In this event, it has been found that a coma acutely takes place in the single aspherical lens element disclosed in the above-referenced patent. This is because the coefficient $p_2$ expressed by the formula (2) must fall within a very narrow range. Accordingly, a good yield of production can not be accomplished when the single aspherical lens element is manufactured.

Moreover, such a single aspherical lens element is practically formed or manufactured from a plastic material by the use of injection molding. It is to be noted that an index of refraction and a dispersion ratio of the plastic material are locally distributed within a very narrow range on a diagram of an index-dispersion ratio and that the plastic material is also inferior to glass material in homogeneity. Therefore, it is difficult to obtain a desired index of refraction and a desired dispersion ratio as long as plastic material is used to form the single aspherical lens element. This means that the degree of freedom is restricted in optically designing such a lens element when plastic material is used.

Besides, plastic material is inferior to glass material in heat resistance, a moisture resistance, temperature characteristic, and weather resistance. Under the circumstances, such a single aspherical lens element is not always suitable for the object lens element of an optical disk device because the above-enumerated characteristics must be satisfied in the object lens element.

SUMMARY OF THE INVENTION

It is an object of this invention to provide an aspherical lens element, wherein it is possible to satisfy characteristics required for an object lens element of an optical disk device.

It is another object of this invention to provide an aspherical lens element of the type described which can be manufactured with an improved production yield.

It is yet another object of this invention to provide an aspherical lens element of the type described, wherein the degree of freedom can be increased on designing the lens element.

It is still another object of this invention to provide an aspherical lens element of the type described, which has excellent heat resistance, humidity durability, and temperature characteristic.

According to this invention, an aspherical glass lens element has an optical axis, a focal length f, a thickness D along the optical axis, and first and second aspherical convex surfaces. The first and the second aspherical convex surfaces have first and second apexes through which the optical axis passes, first and second radii $r_1$ and $r_2$ of curvature at the first and the second apexes, and first and second conical coefficients $k_1$ and $k_2$, respectively, and are determined by first and second predetermined formulae represented as functions of the first and the second radii $r_1$ and $r_2$ and the first and the second conical coefficients $k_1$ and $k_2$. The aspherical glass lens element is defined by the following formulae:

$$1.30 < f/D < 1.80,$$

$$0.18 < (r_1/r_2)D < -0.10, \text{ and}$$

$$-0.08 < k_1/k_2 < 0.04,$$

where an absolute value of the second coefficient $k_2$ is less than 1,000.

DESCRIPTION OF THE PREFERRED EMBODIMENT

Figure 1:
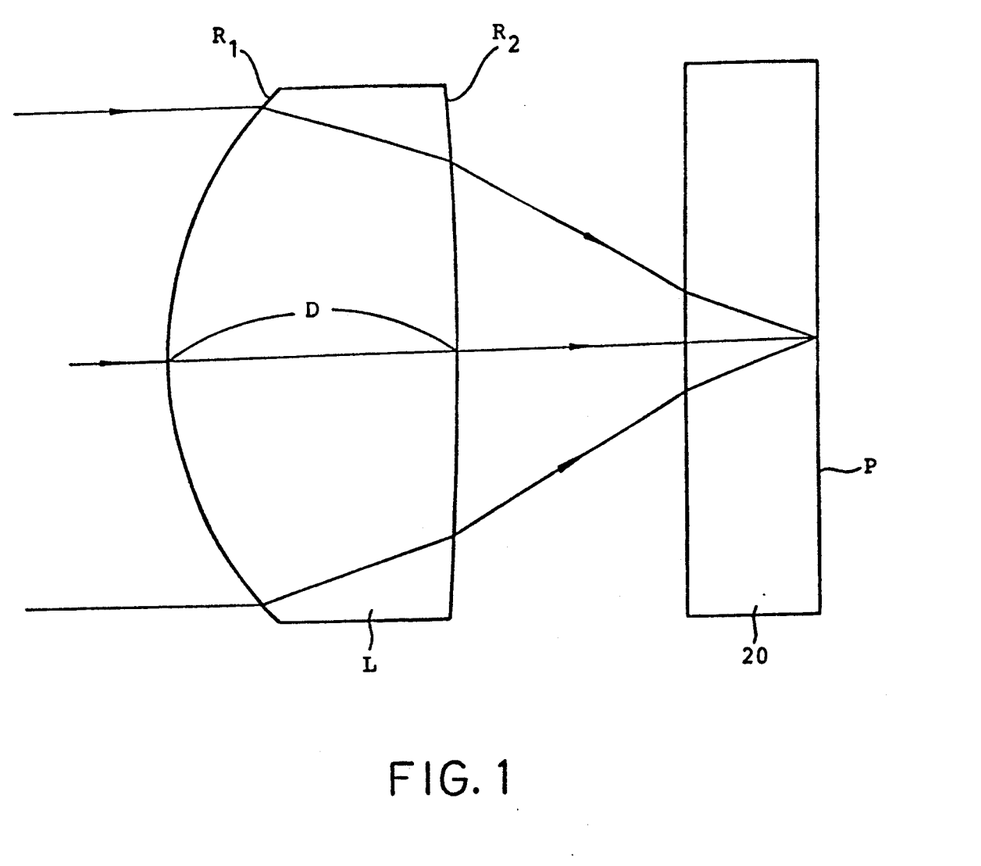
FIG. 1 is a side view of an optical system for use in an optical disk device and which comprises an aspherical glass lens element according to this invention.

Referring to FIG. 1, an aspherical glass lens element L according to a preferred embodiment of this invention is for use in combination with an optical disk device which has a disk cover glass plate 20 having a front surface and a rear surface located on the lefthand and the righthand sides of FIG. 1, respectively. The rear surface of the disk cover glass plate 20 forms a disk recording surface depicted at P. In front of the front surface of the disk cover glass plate 20, the aspherical glass lens element L is disposed, as illustrated in FIG. 1, and provides a single lens system for accessing the disk device. The illustrated aspherical glass lens element L is made of an optical glass material and is movable leftwards or rightwards in FIG. 1 by the use of a mechanism (not shown in FIG. 1). The illustrated aspherical glass lens element L is useful as an object lens element of a pick-up optical system in the optical disk device. To this end, the illustrated aspherical glass lens element L must have a long working distance defined between the front surface of the disk cover glass plate and the second surface of the aspherical glass lens element L.

Herein, let a disk device for a computer memory be able to write information only one time by irradiating a write-in light beam thereon and to thereafter read the information by irradiating a readout light beam. In this case, intensity of the write-in beam is stronger than that of the readout light beam. When the illustrated aspherical glass lens element is used in both the write-in and the readout operations, the working distance may be changed from one to another in dependency upon the intensity of the light beam.

Moreover, it is assumed that the aspherical glass lens element L is manufactured as a molded glass lens element by the use of a high precision press method disclosed in Japanese Patent Publication No. Syô 56-378, namely, 378/1981 by the present assignee. Specifically, the aspherical glass lens element is formed by molding the optical glass material in a press-mold.

As illustrated in FIG. 1, the aspherical glass lens element L is formed as a double-convex lens element and has an entrance or a first surface $R_1$ and an exit or a second surface $R_2$ which are directed to the lefthand and the righthand sides in FIG. 1, respectively. The first and the second surfaces $R_1$ and $R_2$ are formed by aspherical convex surfaces of axial symmetry. In this connection, each of the first and the second surfaces $R_1$ and $R_2$ has an apex through which an optical axis passes. In the example being illustrated, the optical glass material of the aspherical glass lens element L has an index nd of refraction and an Abbe number Vd which are equal, for example, to 1.73077 and 40.5, respectively. In addition, the first and the second surfaces $R_1$ and $R_2$ are defined by:

$$Z_1 = (C_1 Y^2)/(1 + (1-(1+k_1)C_1^2 Y^2)^{\frac{1}{2}}) + E_1 Y^4 + F_1 Y^6 + G_1 Y^8 + H_1 Y^{10} \text{ and} \qquad (3)$$

$$Z_2 = (C_2 Y^2)/(1 + (1-(1+k_2)C_2^2 Y^2)^{\frac{1}{2}}) + E_2 Y^4 + F_2 Y^6 + G_2 Y^8 + H_2 Y^{10}, \qquad (4)$$

where Y is representative of incident height from the optical axis;

$Z_1$ is representative of distance between a point placed on the first surface at the incident height Y from the optical axis and a tangential plane which is tangent to the first surface at the apex of the first surface;

$Z_2$ is representative of a distance between a point placed on the second surface at the incident height Y from the optical axis and a tangential plane which is tangential to the second surface at the apex of the second surface;

$C_1$ is representative of curvature of the apex of the first surface $R_1$ and is equal to $(1/r_1)$;

$C_2$ is representative of curvature of the apex of the second surface $R_2$ and is equal to $(1/r_2)$;

$k_1$ is representative of the conical coefficient of the first surface;

$k_2$ is representative of the conical coefficient of cone of the second surface;

$E_1$, $F_1$, $G_1$, and $H_1$ are representative of those aspherical coefficients of the first surface which are proportional to fourth, sixth, eighth, and tenth power of the incident height Y, respectively; and $E_2$, $F_2$, $G_2$, and $H_2$, are representative of those aspherical coefficients of the second surface which are proportional to fourth, sixth, eighth, and tenth power of the incident height Y respectively; where in turn $r_1$ and $r_2$ are representative of radii of curvature of the apexes of the first and the second surfaces $R_1$ and $R_2$, respectively.

Thus, the first and the second surfaces $R_1$ and $R_2$ of the aspherical glass lens element L are represented by a common general formula which is given by:

$$Z = (CY^2)/(1+(1-(1+k)C^2Y^2)^{\frac{1}{2}}) + EY^4 + FY^6 + GY^8 + HY^{10}.$$

This shows that refractive power of each surface can be favorably assigned to both the first and the second surfaces $R_1$ and $R_2$. As a result, refractive power of the surface is balanced on the first and the second surfaces $R_1$ and $R_2$, which serves to minimize occurrences of various kinds of aberrations.

However, even when the aberrations are minimized by determining the first and the second surfaces $R_1$ and $R_2$ in accordance with Equations (3) and (4), such an object lens element determined by Equations (3) and (4) does not always have a sufficient long working distance for the object lens element used for the optical disk device. The factor f/D may be referred to as a focal length-to-thickness factor or a first factor.

According to the inventors' experimental studies, it has been found out that the first factor f/D may fall within a range given by:

$$1.30 < f/D < 1.80. \qquad (5)$$

When the first factor f/D is smaller than 1.30, the thickness D is too great in comparison with the focal length f to make the working distance long enough even when the refractive power of the surface is pertinently assigned to both the first and the second surfaces $R_1$ and $R_2$. In addition, an increase of the thickness D makes the aspherical glass lens element heavy, which undesirably affects an actuator (not shown) used for tracking and focusing control. Therefore, use of such a heavy glass lens element is not practical.

On the other hand, when the thickness D exceeds 1.80 in expression (5), eccentric or decentering tolerance becomes excessively small in centering the axes of the press-molds used for manufacturing the aspherical glass lens element. This makes fabrication of the aspherical glass lens element difficult and consequently degrades production yield.

When the thickness D is selected so that it satisfies the expression (5), the refractive power of each surface is changed from one to another on each of the first and the second surfaces $R_1$ and $R_2$. In this connection, the radii $r_1$ and $r_2$ of curvature of the first and the second surfaces $R_1$ and $R_2$ should be determined in relation to the thickness D so as to optimize the refractive power of each surface. In order to evaluate the refractive power of each surface, consideration is made about a factor which is related to the radii $r_1$ and $r_2$ and the thickness D and which is given by $(r_1/r_2)D$. The factor $(r_1/r_2)D$ may be referred to as a second factor and must be selected within a range defined by:

$$-0.18 < (r_1/r_2)D < -0.10. \qquad (6)$$

Herein, let the second factor $(r_1/r_2)D$ be greater than $-0.10$ by a reduction of $r_1$. In this event, the power of the refraction surface is excessively displaced or shifted towards the first surface $R_1$ from the second surface $R_2$. In other words, a principal point of the aspherical glass lens element L is unfavorably moved forwards or leftwards in FIG. 1. As a result, the working distance becomes small.

On the other hand, when the second factor $(r_1/r_2)D$ becomes less than $-0.18$ with an increase of $r_1$, the principal point of the aspherical glass lens element L is undesirably moved rightwards in FIG. 1. Consequently, the working distance becomes long. However, a spherical one of the aberrations can not be corrected on the optical axis even by an aspherical effect of the aspherical glass lens element L. Thus, the aberrations on the optical axis are deteriorated when the second factor is smaller than $-0.18$.

In addition, the above consideration has been made about improvement of the aberrations on the principal or optical axis. However, the aberrations should also be improved in relation to offaxial rays which pass through a portion different from the optical axis. In order to favorably correct offaxial optical performance, a third factor is considered in connection with the conical coefficients $k_1$ and $k_2$ of the first and the second surfaces $R_1$ and $R_2$, respectively. Specifically, the third factor is given by $k_1/k_2$ and is selected within a range between $-0.08$ and $0.04$, both exclusive. In other words, the third factor satisfies the following expression:

$$-0.08 < k_1/k_2 < 0.04, \qquad (7)$$

where an absolute value of $k_2$ is less than 1,000.

If the third factor $k_1/k_2$ is less than $-0.08$ or greater than $0.04$, either an offaxial coma or an offaxial astigmatism takes place and offaxial aberrations are consequently magnified.

When the expressions (5) through (7) are all satisfied, the working distance becomes sufficiently long and offaxial astigmatism and the other aberrations on the optical axis are favorably corrected.

As mentioned before, optical glass material is used to form the aspherical glass lens element L. Accordingly, the illustrated aspherical glass lens element L has excellent heat resistance, humidity durability, temperature characteristic, and uniformity. In addition, such an aspherical glass lens element L solely serves as the object lens element and is therefore light in weight and compact in size in comparison with a combination of a plurality of glass lens elements. Consequently, the aspherical lens element is movable at a high speed without imposing an excessive burden on the actuator. Moreover, the aspherical glass lens element can be manufactured and assembled at a low cost.

The aspherical glass lens element L is manufactured by press-molding, as mentioned before. Accordingly, it is possible to avoid a grinding process necessary for manufacturing the usual lens element. This enables mass production and a low cost of such aspherical glass lens elements.

A wide variety of optical glass materials may be used to form the aspherical glass lens element. This shows that various kinds of optical characteristics can be realized by selecting optical glass materials. Specifically, when the transformation temperature of an optical glass material is pertinently selected, it is possible to faithfully transfer a configuration of the aspherical glass lens element from the mold on molding.

Tables 1 and 2 show first through fifth embodiments designed in accordance with this invention with the above-mentioned expressions (3) through (7) satisfied.

TABLE 1

|  | 1st Embodiment | 2nd Embodiment | 3rd Embodiment |
| --- | --- | --- | --- |
| f | 4.200 | 4.200 | 4.200 |
| D | 2.400 | 2.400 | 2.400 |
| $r_1$ | 3.71004 | 3.13245 | 3.15363 |
| $k_1$ | −0.624183 | −0.613230 | −0.619770 |
| $E_1$ | 0.456787E-3 | 0.490066E-3 | 0.469153E-3 |
| $F_1$ | 0.766746E-5 | 0.362536E-4 | 0.189056E-4 |

TABLE 1-continued

|  | 1st Embodiment | 2nd Embodiment | 3rd Embodiment |
| --- | --- | --- | --- |
| $G_1$ | −0.591605E-5 | −0.686500E-5 | −0.503747E-5 |
| $H_1$ | −0.205936E-5 | −0.124968E-5 | −0.187574E-5 |
| $r_2$ | −43.50772 | −57.00511 | −48.46805 |
| $k_2$ | −18.046232 | −18.046079 | −18.046070 |
| $E_2$ | 0.155929E-2 | 0.166698E-2 | 0.161780E-2 |
| $F_2$ | −0.228723E-3 | −0.142878E-3 | −0.196868E-3 |
| $G_2$ | −0.905217E-4 | −0.847377E-4 | −0.841619E-4 |
| $H_2$ | 0.125335E-4 | 0.112681E-4 | 0.111130E-4 |
| f/D | 1.7500 | 1.75 | 1.75 |
| $(r_1/r_2)D$ | −0.1749 | −0.1319 | −0.1562 |
| $k_1/k_2$ | 0.0346 | 0.03340 | 0.03434 |

TABLE 2

|  | 4th Embodiment | 5th Embodiment |
| --- | --- | --- |
| f | 4.200 | 4.200 |
| D | 2.500 | 2.500 |
| $r_1$ | 3.16184 | 3.10450 |
| $k_1$ | −0.619731 | −0.598109 |
| $E_1$ | 0.473621E-3 | 0.560210E-3 |
| $F_1$ | 0.142178E-4 | 0.647281E-4 |
| $G_1$ | −0.451559E-5 | −0.894670E-5 |
| $H_1$ | −0.148917E-5 | −0.153110E-7 |
| $r_2$ | −44.95415 | −73.30762 |
| $k_2$ | −18.046075 | −18.045767 |
| $E_2$ | 0.164425E-2 | 0.210723E-2 |
| $F_2$ | −0.191923E-3 | −0.905292E-4 |
| $G_2$ | −0.839643E-4 | −0.818445E-4 |
| $H_2$ | 0.119320E-4 | 0.122416E-4 |
| f/D | 1.68 | 1.68 |
| $(r_1/r_2)D$ | −0.1758 | −0.1059 |
| $k_1/k_2$ | 0.03434 | 0.0331 |

Figure 2:
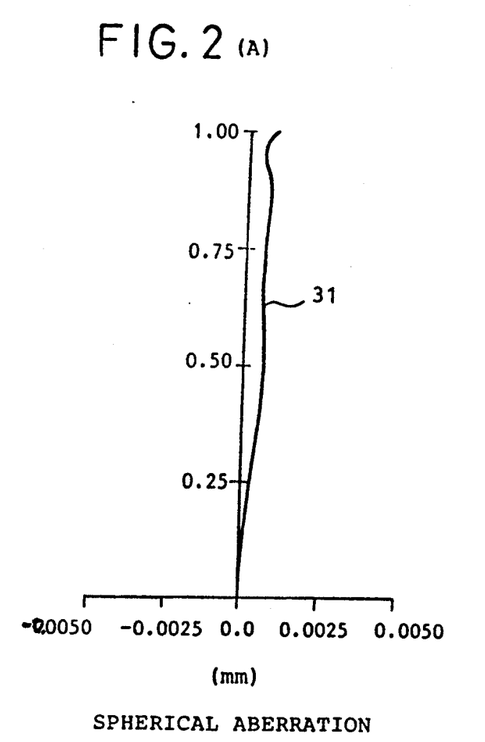
FIGS. 2(A) through 2(H) are graphical representations of spherical aberrations, astigmatisms, and comae in an aspherical glass lens element according to a first embodiment of this invention.

Referring to FIGS. 2(A) through (H), illustrations are given for optical characteristics of the aspherical glass lens element according to the first embodiment of this invention. Specifically, a spherical aberration and an astigmatism are shown in FIGS. 2(A) and (B) as examples of the optical characteristics of the aspherical glass lens element according to the first embodiment, respectively. In FIG. 2(A), the ordinate represents the ratio of height of an incident parallel ray from an optical axis and the height of an aperture stop on the assumption that the height of the aperture stop is kept at unity. The abscissa represents the position at which the incident rays intersect the optical axis. The origin of the graph is representative of the focal point while plus and minus regions in FIG. 2(A) correspond to righthand and lefthand directions along the optical axis of FIG. 1, respectively. As shown in FIG. 2(A), the aspherical glass lens element L according to the first embodiment of this invention has a spherical aberration expressed by spherical aberration curve 31.

In FIG. 2(B), the ordinate represents a half field angle of offaxial rays while the abscissa represents a light collection point at each field angle in terms of a dislocation of the focal point in the optical axis direction. In this FIGURE, curves T and S represent light collection points on tangential (meridional) and sagittal planes, respectively.

Figure 2C:
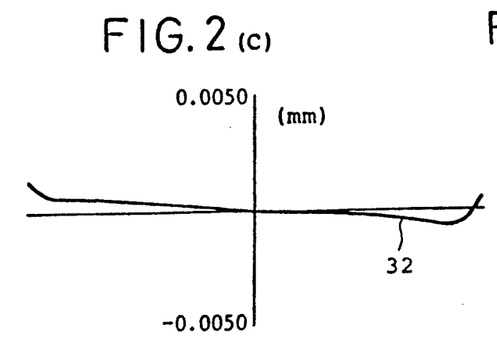
Figure 2D:
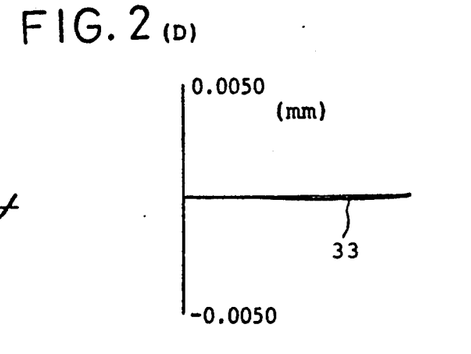

In addition, FIGS. 2(C) and (D) show comae which are calculated along tangential (meridional) and sagittal directions with respect to an incident ray on the first surface R₁ at a field angle of 100%, respectively, and are expressed by tangential and sagittal aberration curves 32 and 33. As well known in the art, the abscissa and the ordinate of each of FIGS. 2(C) and (D) represent distance from a principal ray and difference in height between the principal ray and a tracing ray, respectively.

Figure 2E:
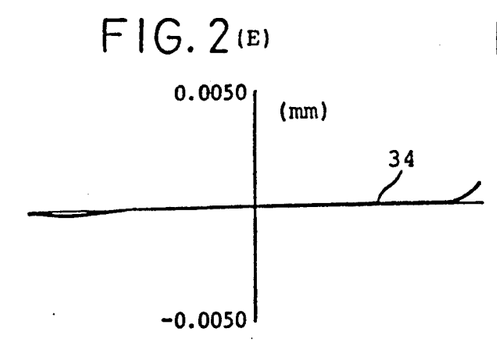
Figure 2F:
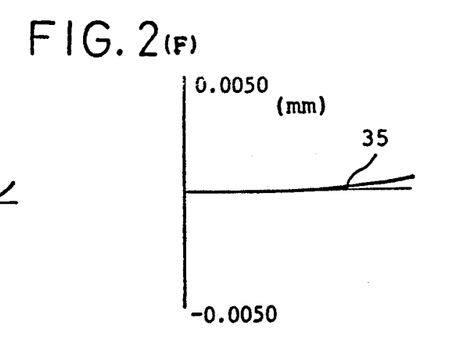

Likewise, FIGS. 2(E) and (F) show comae calculated in tangential and sagittal directions with respect to an incident ray on the first surface R₁ at a field angle of 50%, respectively, and are specified by additional tangential and sagittal aberration curves 34 and 35.

Figure 2G:
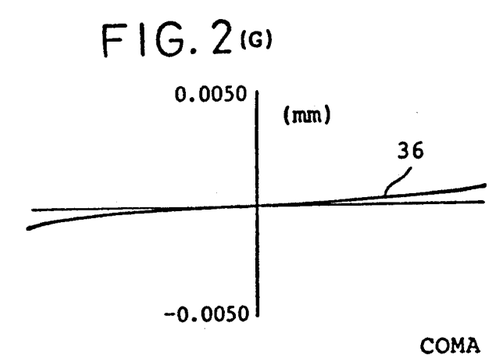
Figure 2H:
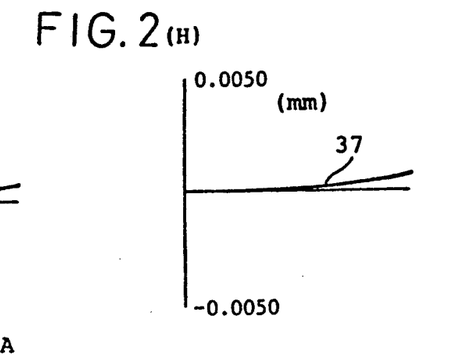
Figure 3A:
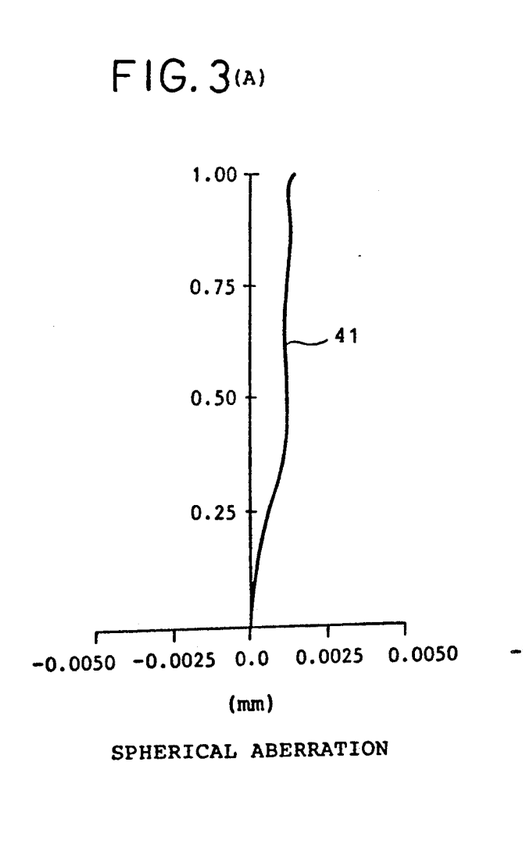
FIGS. 3(A) through 3(H) show similar optical characteristics of an aspherical glass lens element according to a second embodiment of this invention.
Figure 3B:
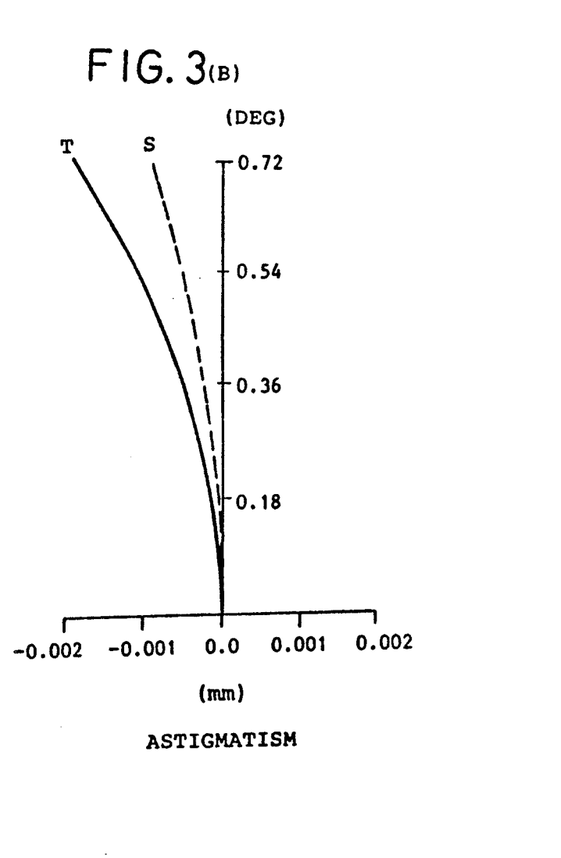
Figure 3C:
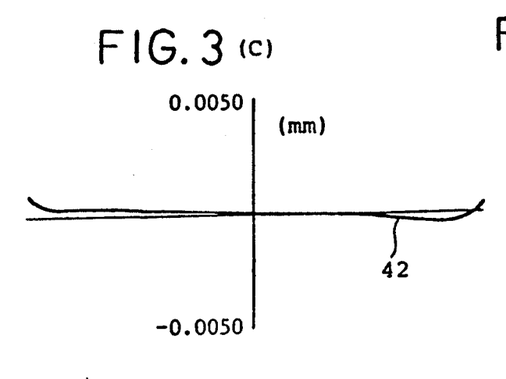
Figure 3D:
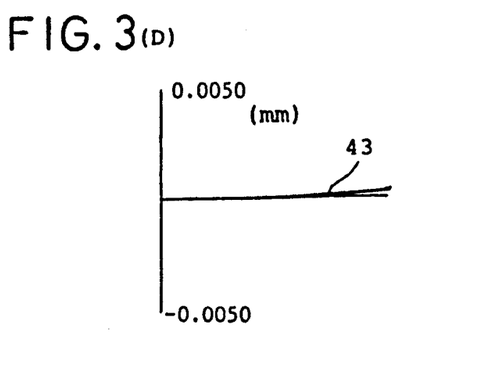
Figure 3E:
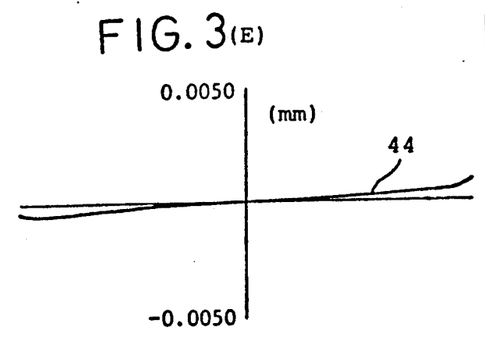
Figure 3F:
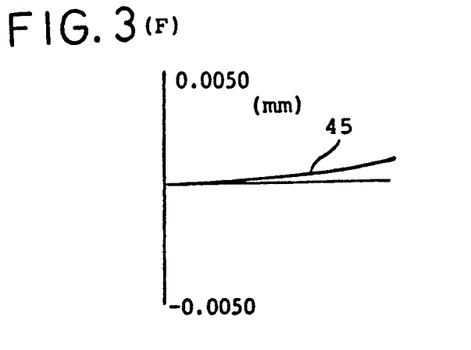
Figure 3G:
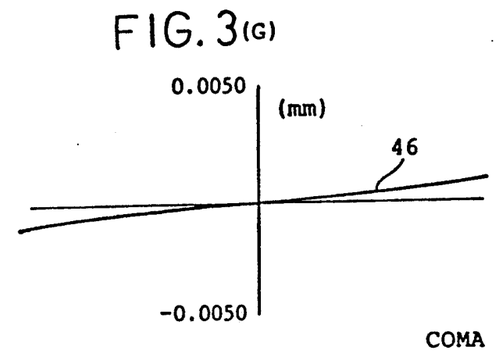
Figure 3H:
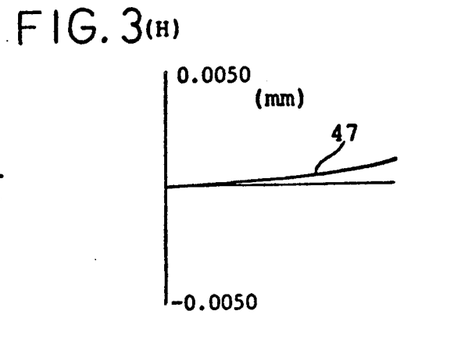
Figure 4A:
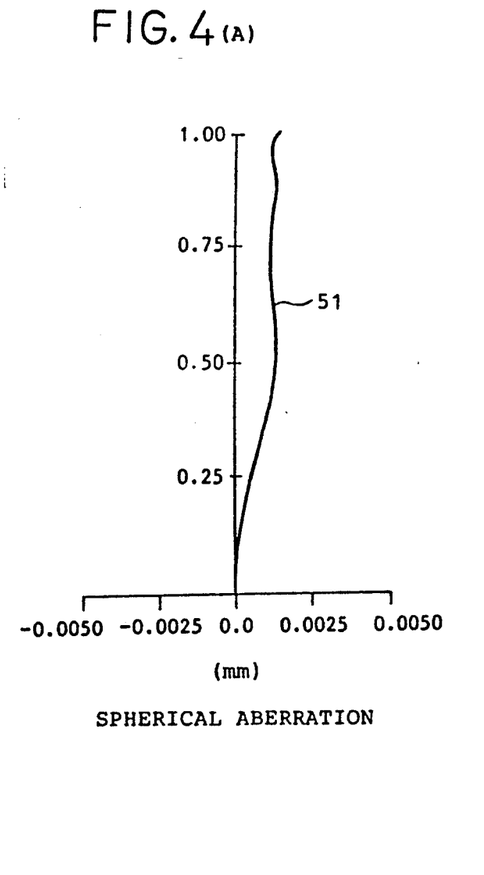
FIGS. 4(A) through 4(H) show similar optical characteristics of an aspherical glass lens element according to a third embodiment of this invention.
Figure 4B:
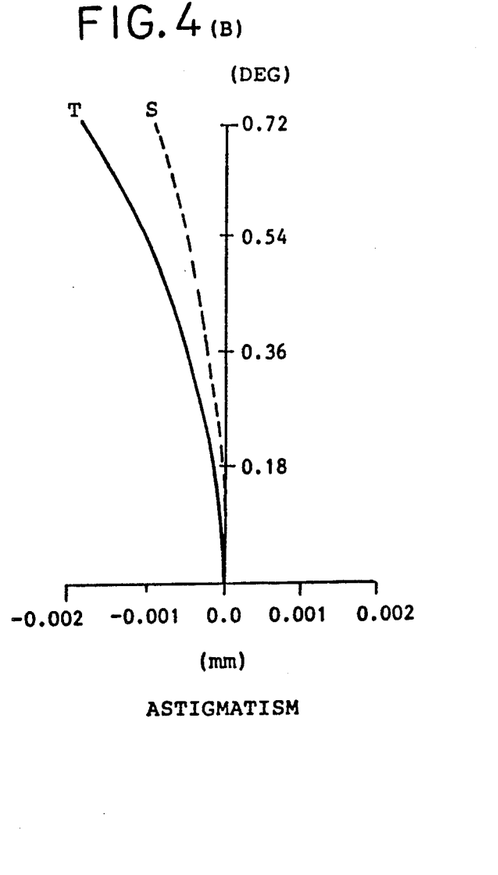
Figure 4C:
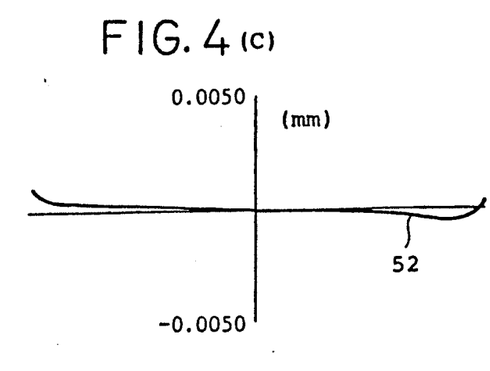
Figure 4D:
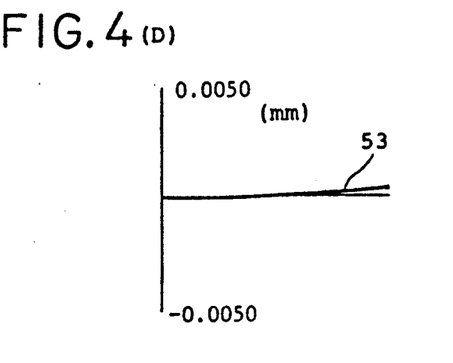
Figure 4E:
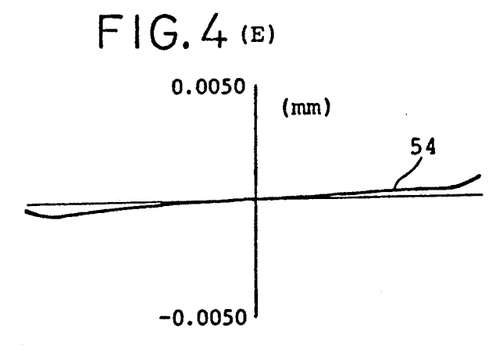
Figure 4F:
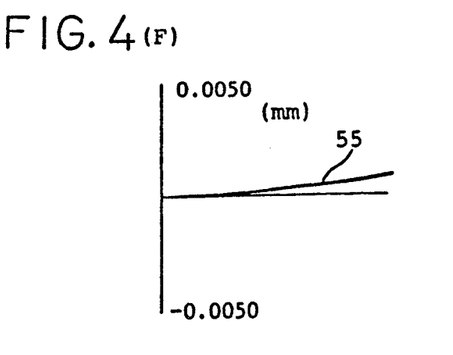
Figure 4G:
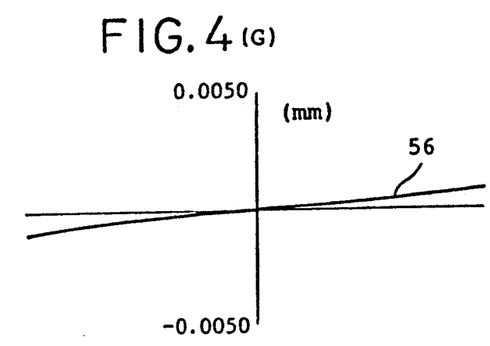
Figure 4H:
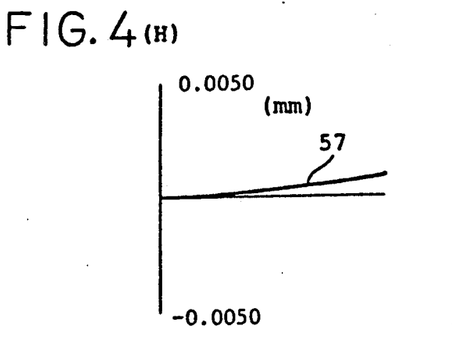
Figure 5A:
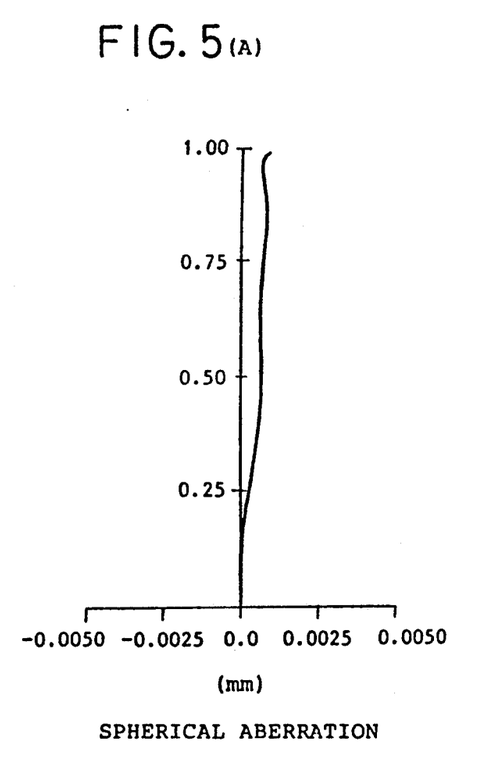
FIGS. 5(A) through 5(H) shows similar optical characteristics of an aspherical glass lens element according to a fourth embodiment of this invention.
Figure 5B:
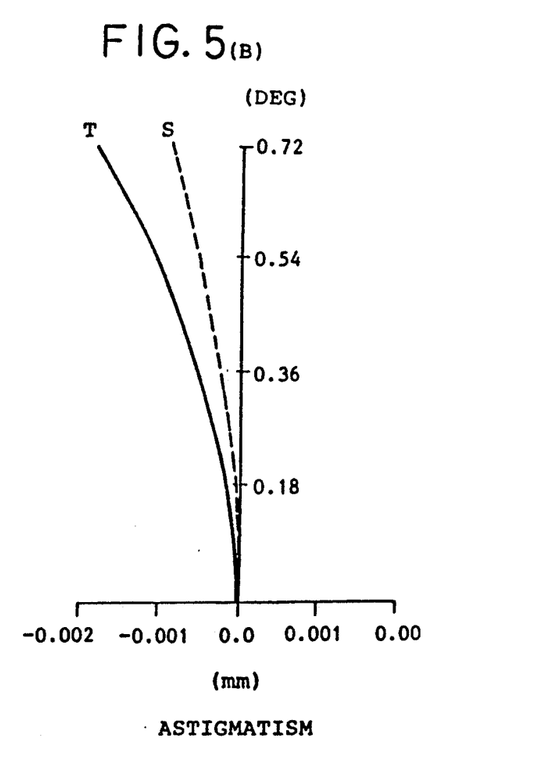
Figure 5C:
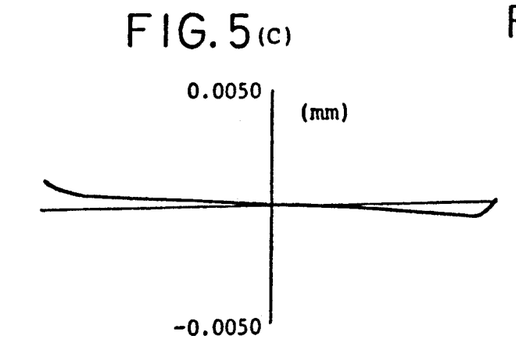
Figure 5D:
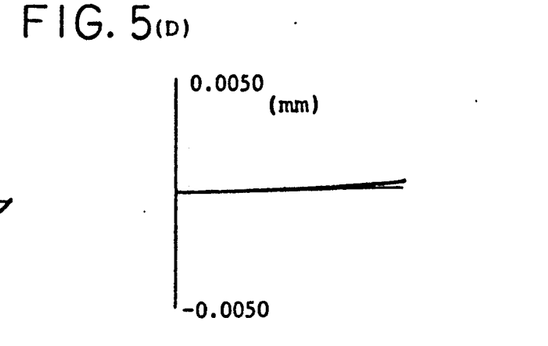
Figure 5E:
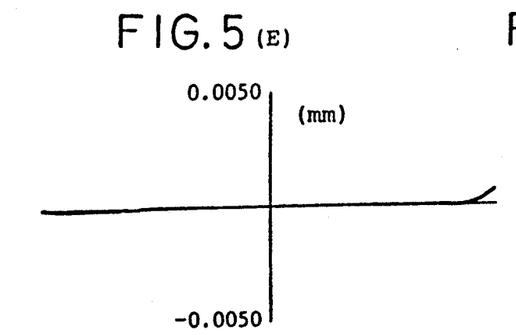
Figure 5F:
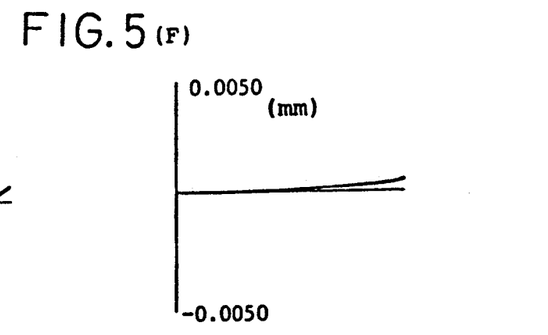
Figure 5G:
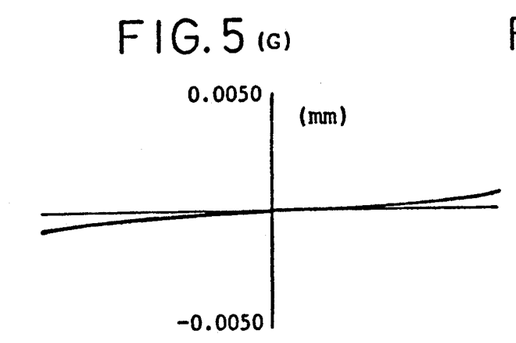
Figure 5H:
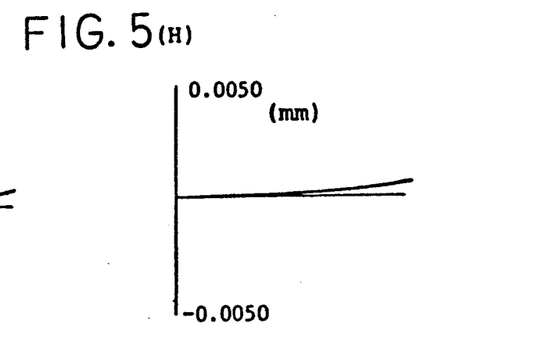

Moreover, FIGS. 2(G) and (H) show comae calculated in the tangential and the sagittal directions with respect to a ray on axis and are specified by axial tangential and sagittal aberration curves 36 and 37.

Referring to FIGS. 3(A) through (H) which are in one-to-one correspondence to FIGS. 2(A) through (H), respectively, optical characteristics of the aspherical glass lens element according to the second embodiment of this invention are illustrated so as to clarify the effectiveness of this invention. In this connection, it is readily understood that curves 41, T, S, 42, 43, 44, 45, 46, and 47 exhibit aberration curves similar to those illustrated in FIGS. 2(A) through (H), respectively.

Referring to FIGS. 4(A) through (H), the aspherical glass lens element according to the third embodiment of this invention has a spherical aberration, an astigmatism, and comae expressed by aberration curves 51, T, S, and 52 through 57 corresponding to 31, T, S, and 32 through 37 illustrated in FIGS. 2(A) through (H).

Figure 6:
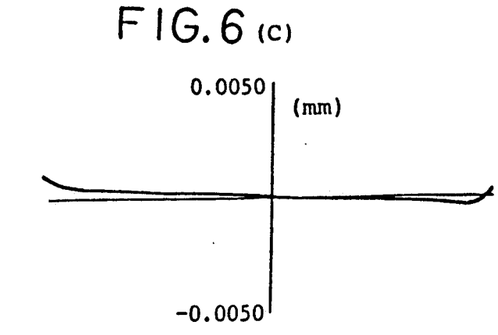
FIGS. 6(A) through 6(H) show similar optical characteristics of an aspherical glass lens element according to a fifth embodiment of this invention.
Figure 6A:
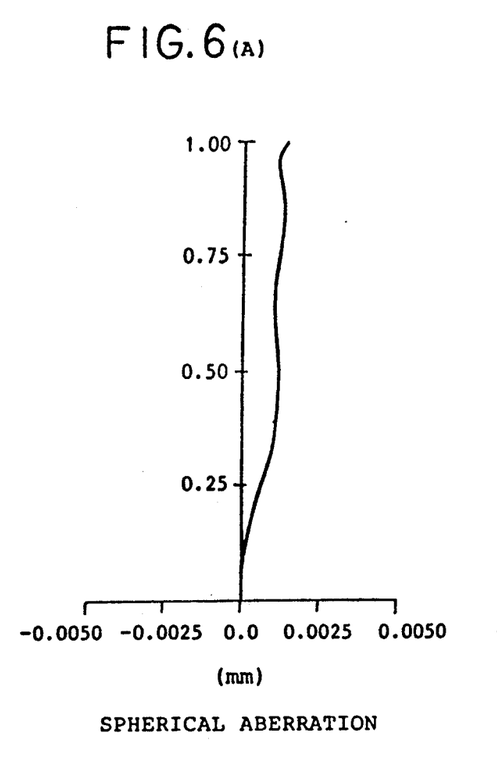
Figure 6B:
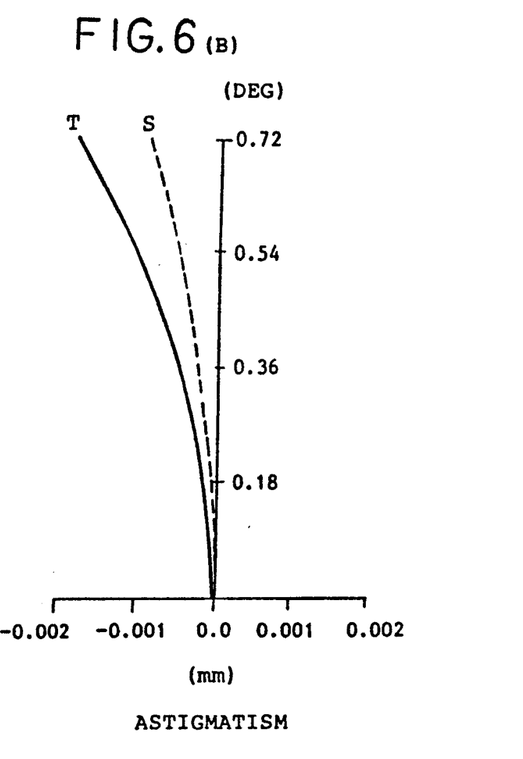
Figure 7A:
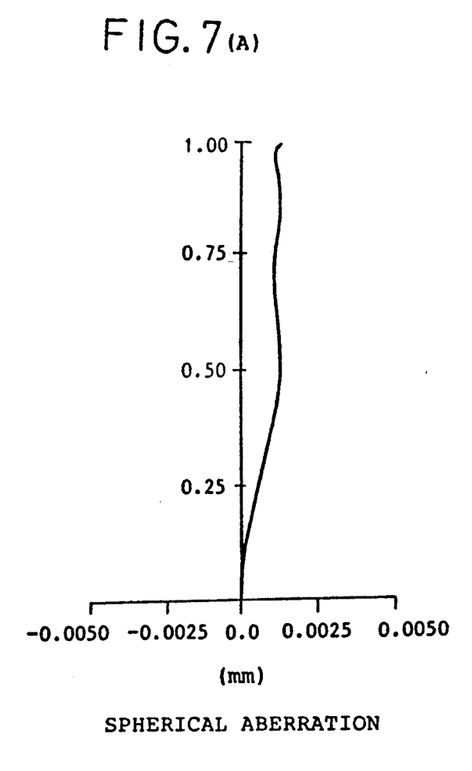
FIGS. 7(A) through 7(H) show similar optical characteristics of an aspherical glass lens element according to a sixth embodiment of this invention.
Figure 7B:
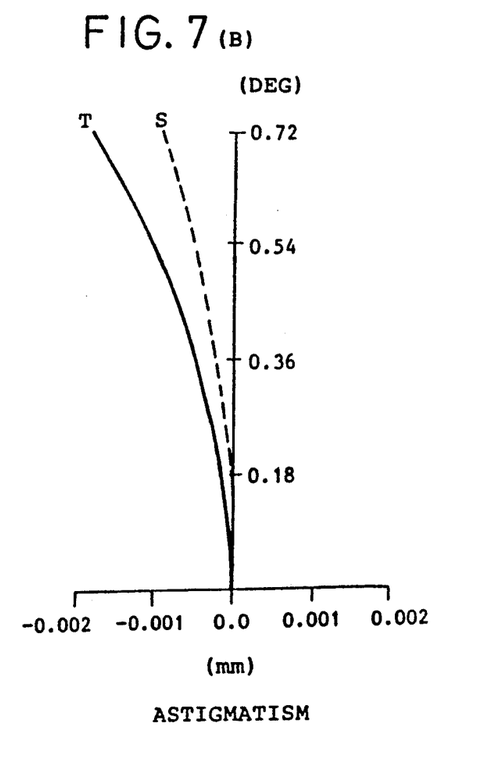
Figure 7C:
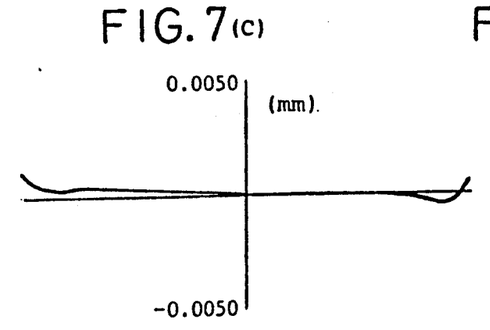
Figure 7D:
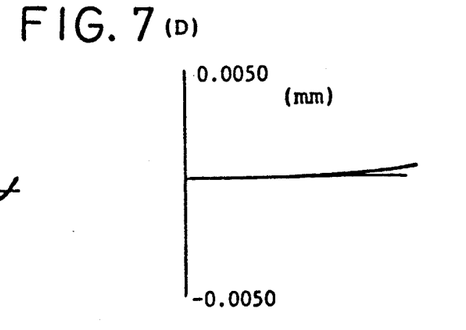
Figure 7E:
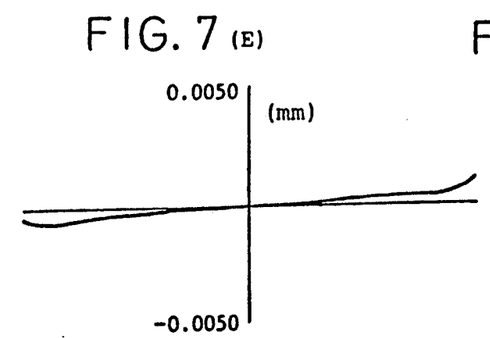
Figure 7F:
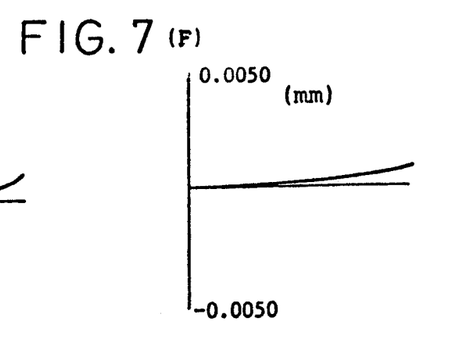
Figure 7G:
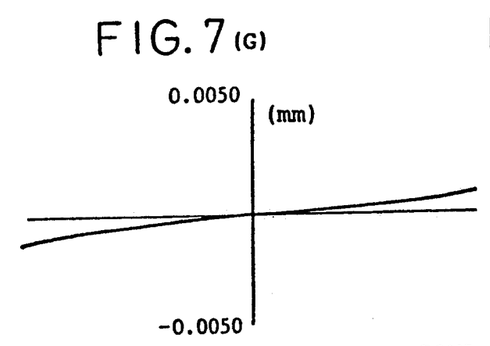
Figure 7H:
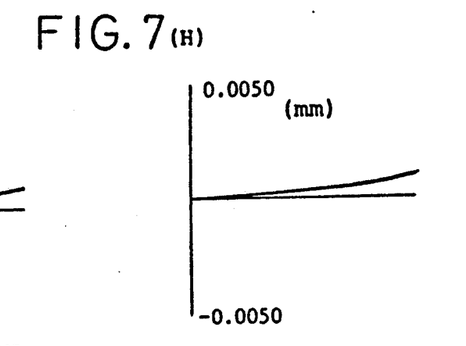

Similarly, the aspherical glass lens elements according to the fourth through the sixth embodiments of this invention have optical characteristics, as illustrated in FIGS. 5 through 7, respectively. In each of FIGS. 5 through 7, suffixes A through H in parentheses are in one-to-one correspondence to A through H of each of FIGS. 2 through 4 and therefore show spherical aberrations, astigmatisms, and coma aberrations, as mentioned in conjunction with FIGS. 2(A) through (H).

As readily understood from each of the aberration curves illustrated in FIGS. 2 through 7, each aspherical glass lens element according to the first through the sixth embodiments of this invention has, within the field angle between ±1 degree, excellent optical characteristics which are not less than those of the combination glass lens systems.

While this invention has been described in conjunction with several embodiments thereof, it will readily be possible for those skilled in the art to put this invention into practice in various other ways. For example, Equations (3) and (4) may include odd-numbered terms in addition to even-numbered terms.

What is claimed is:

1. An aspherical glass lens element having an optical axis, a focal length f, a thickness D along said optical axis, and first and second aspherical convex surfaces, said first and said second aspherical convex surfaces having first and second apexes through which said optical axis passes, first and second radii of curvature $r_1$ and $r_2$ at said first and said second apexes, and first and second conical coefficients $k_1$ and $k_2$, respectively, and being determined by first and second predetermined formulae represented as functions of said first and said second radii $r_1$ and $r_2$ and said first and said second conical coefficients $k_1$ and $k_2$, said aspherical glass lens element being defined by the following formulae:

$$1.68 < f/D < 1.75,$$

$$-0.18 < (r_1/r_2)D < -0.10, \text{ and}$$

$$-0.08 < k_1/k_2 < 0.04,$$

where an absolute value of said second coefficient $k_2$ is smaller than 1,000.

2. An aspherical glass lens element as claimed in claim 1, wherein said first and said second predetermined formulae are given by:

$$Z_1 = (C_1Y^2)/(1+(1-(1=k_1)C_1^2Y^2)^{\frac{1}{2}}) + E_1Y^4 + F_1Y^6 + G_1Y^8 + H_1Y^{10} \text{ and}$$

$$Z_2 = (C_2Y^2)/(1+(1-(1=k_2)C_2^2Y^2)^{\frac{1}{2}}) + E_2Y^4 + F_2Y^6 + G_2Y^8 + H_2Y^{10},$$

where Y is representative of an incident height from the optical axis;

$Z_1$ representative of a distance between a point placed on the first surface at the incident height Y and a tangential plane which is tangential to the first surface at the apex of the first surface;

$Z_2$ is representative of a distance between a point placed on the second surface at the incident height Y and a tangential plane which is tangential to the second surface at the apex of the second surface;

$C_1$ is curvature of the apex of the first surface $R_1$ and is equal to $(1/r_1)$;

$C_2$ is representative of curvature of the apex of the second surface $R_2$ and is equal to $(1/r_2)$;

$k_1$ is representative of a coefficient of cone of the first surface;

$k_2$ is representative of a coefficient of cone of the second surface;

$E_1$, $F_1$, $G_1$, and $H_1$ are representative of those aspherical coefficients of the first surface which are proportional to fourth, sixth, eighth, and tenth power of the incident height Y, respectively; and $E_2$, $F_2$, $G_2$, and $H_2$, are representative of those aspherical coefficients of the second surface which are proportional to fourth, sixth, eighth, and tenth power of the incident height Y;

where in turn $r_1$ and $r_2$ are representative of radii of curvature of the apexes of the first and the second surfaces $R_1$ and $R_2$, respectively.

3. An aspherical glass lens element as claimed in claim 2, having the following numerical data:
$f=4.200$, $D=2.400$, $r_1=3.17004$, $k_1=-0.624183$, $E_1=0.456787E-3$, $F_1=0.766746E-5$, $G_1=-0.591605E-5$, $H_1=-0.205936E-5$, $r_2=-43.50772$, $k_2=-18.046232$, $E_2=0.155929E-2$, $F_2=-0.228723E-3$, $G_2=-0.905217E-4$, $H_2=0.125335E-4$, $f/D=1.7500$, $(r_1/r_2)D=-0.1749$, and $k_1/k_2=0.0346$.

4. An aspherical glass lens element as claimed in claim 2, having the following numerical data:
$f=4.200$, $D=2.400$, $r_1=3.13245$, $k_1=-0.613230$, $E_1=0.490066E-3$, $F_1=0.362536E-4$, $G_1=-0.686500E-5$, $H_1=-0.124968E-5$, $r_2=-57.00511$, $k_2=-18.046079$, $E_2=0.166698E-2$, $F_2=-0.142878E-3$, $G_2=-0.847377E-4$, $H_2=0.112681E-4$, $f/D=1.75$, $(r_1/r_2)D=-0.1319$, and $k_1/k_2=0.03340$.

5. An aspherical glass lens element as claimed in claim 2, having the following numerical data:
$f=4.200$, $D=2.400$, $r_1=3.15363$, $k_1=-0.619770$, $E_1=0.469153E-3$, $F=0.189056E-4$, $G_1=-0.503747E-5$, $H_1=-0.187574E-5$, $r_2=-48.46805$, $k_2=-18.046070$, $E_2=0.161780E-2$, $F_2=-0.196868E-3$, $G_2=-0.841619E-4$, $H_2=0.111130E-4$, $f/D=1.75$, $(r_1/r_2)D=-0.1562$, and $k_1/k_2=0.03434$.

6. An aspherical glass lens element as claimed in claim 2, having the following numerical data:
$f=4.200$, $D=2.500$, $r_1=3.16184$, $k_1=-0.619731$, $E_1=0.473621E-3$, $F_1=0.142178E-4$, $G_1=-0.451559E-5$, $H_1=-0.148917E-5$, $r_2=-44.95415$, $k_2=-18.046075$, $E_2=0.164425E-2$, $F_2=-0.191923E-3$, $G_2=-0.839643E-4$, $H_2=0.119320E-4$, $f/D=1.68$, $(r_1/r_2)D=-0.1758$, and $k_1/k_2=0.03434$.

7. An aspherical glass lens element as claimed in claim 2, having the following numerical data:
$f=4.200$, $D=2.500$, $r_1=3.10450$, $k_1=-0.598109$, $E_1=0.560210E-3$, $F_1=0.647281E-4$, $G_1=-0.894670E-5$, $H_1=-0.153110E-7$, $r_2=-73.30762$, $k_2=-18.045767$, $E_2=0.210723E-2$, $F_2=-0.905292E-4$, $G_2=-0.818445E-4$, $H_2=0.122416E-4$, $f/D=1.68$, $(r_1/r_2)D=-0.1059$, and $k_1/k_2=0.0331$.

8. An aspherical glass lens element as claimed in claim 1 used as a single object lens of an optical disk device adapted for receiving a light beam with parallel rays and having resolving power of 1 or less micron meters.

* * * * *